Dec. 26, 1967 J. SCHEIMAN ET AL 3,359,783

MAGNETIC TAPE WEAR SIMULATOR

Filed April 4, 1966 2 Sheets-Sheet 1

INVENTORS.
JACK SCHEIMAN
ROBERT SCHWARTZ
BY
AGENT
ATTORNEY

MAGNETIC TAPE WEAR SIMULATOR

Filed April 4, 1966 2 Sheets-Sheet 2

INVENTORS.
JACK SCHEIMAN
ROBERT SCHWARTZ
BY Arthur L. Bowers
AGENT

ATTORNEY

3,359,783
MAGNETIC TAPE WEAR SIMULATOR

Jack Scheiman, Howard Beach, and Robert Schwartz, Brooklyn, N.Y., assignors to the United States of America as represented by the Secretary of the Navy Filed Apr. 4, 1966, Ser. No. 540,096
3 Claims. (Cl. 73—7)

Figure 1:
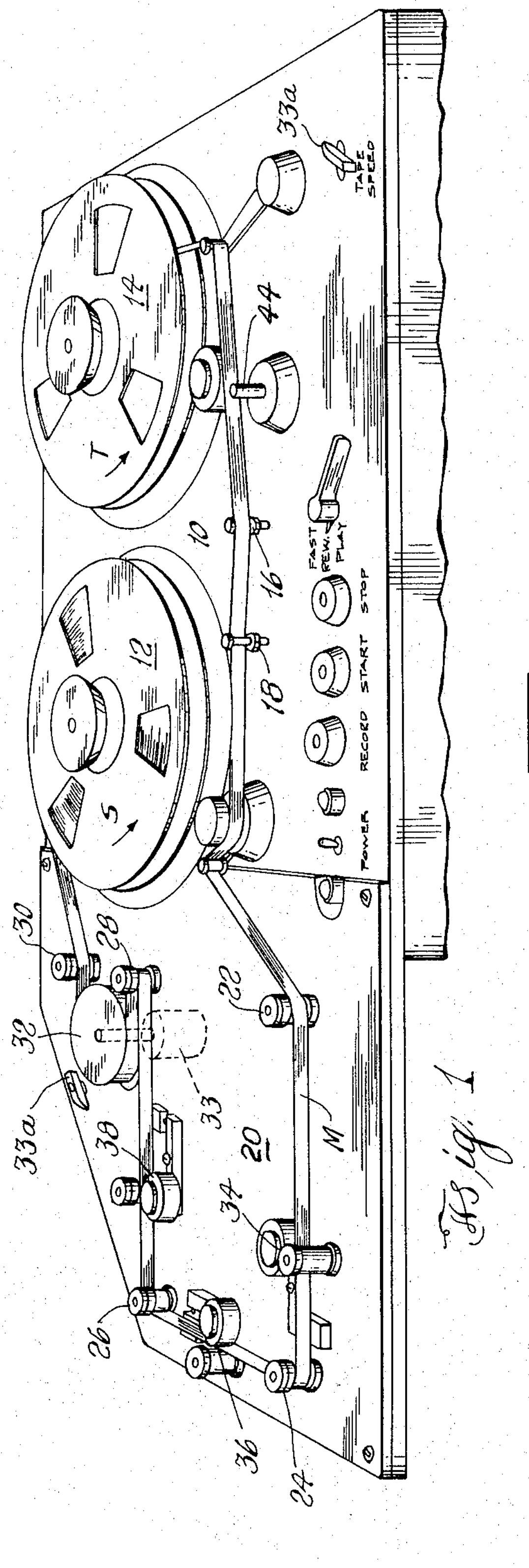

The invention described herein may be manufactured and used by or for the Government of the United States of America for governmental purposes without the payment of any royalties thereon or therefor.

This invention relates to improved techniques for evaluating and ranking magnetic tape and for testing recorder-reproducers for tape wear.

The common method of rating tapes heretofore has been the straight-forward approach of determining tape wear resulting from actual use on a specific tape transport operating under specified operating conditions for all tapes tested thereby. Tape wear is judged in terms of degradation of performance as a function the number of passes of the tape through the transport. A sinusoid of specified wavelength is recorded along the tape and then the tape is run through the transport for a substantial number of passes, e.g. 100, during which the played back output is metered. Though the results obtained by this method are very realistic, the test is very expensive in terms of labor and recorder-reproducer costs as well as being very time consuming. In addition the results of such tests are subject to wear of components of the transport during the test. A full reel of test tape is used rather than a short length tape loop, since there has been evidence that the tape wear may vary considerably with tape length. Another tape rating method has utilized abrasion techniques; tape wear was judged in terms of rate of loss of coating material. Experience has shown that wear produced by abrasion tests are not necessarily related to tape wear on a tape transport.

Similarly tests to check differences in wear rates on different tape transports are carried out by running reels of the same type of tape on a number of different transports otherwise using the same technique as above, and then comparing results.

A major performance characteristic of magnetic tape used in instrumentation and data recording and realistic guide to their quality concerns drop-outs. Drop-outs in magnetic tape systems are discussed in Naval Research Laboratory Report 5627 dated Aug. 7, 1961, by R. H. Carson. Some of the following discussion on dropouts is based on material in that report. If a constant amplitude sinusoidal signal is recorded along a magnetic tape by a magnetic recording system, a drop-out is any reduction of playback signal amplitude from the normal, as reproduced by the magnetic recording system. There is no standardized precise quantitative definition of the term drop-out and thus its meaning varies among various groups doing work in this field. A definition of dropout for a specific case includes tape speed, width of track, frequency of recorded signal, reduction in signal amplitude in excess of a specified quantity, lasting a period of time falling between specified limits. For example, one definition of dropout may be a decrease in amplitude of 60 percent or greater for a period of 40 microseconds or greater where 70 kc. is recorded and reproduced at a tape speed of 60 inches per second on a track 50 mils wide. Each quantitative definition of drop-out derives from much study and experience with a particular magnetic tape. For definition purposes the maximum length of a drop-out is established at a length beyond which very few individual drop-outs occur. Signal reductions corresponding to much longer sections of tape than that for drop-outs have been observed but are not of the nature of drop-outs as discussed herein.

In a test run at 7½ inches per second, the maximum time span of a drop-out is 100 microseconds, and the maximum tape length for a drop-out is 75 mils. On the basis of much evidence taken under these conditions it was found that the average length of a drop-out is approximately 15 mils and that very few individual drop-outs extend beyond 75 mils. A very few signal reductions occur over much longer tape lengths, e.g. several inches of the tape. Such extra long signal reductions are not drop-outs. The shorter reductions in signal amplitude occur almost entirely from loss of contact between the magnetic tape and head and from foreign particles either embedded in the tape or on the surface, or a combination of both. The longer reductions in signal amplitude are caused by skew, i.e. azimuth misalignment, physical deformity in the tape due to uneven tensions applied by machine and reels and by temperature and humidity effects. It is expected that temperature and humidity will affect the drop-out count only to the degree that they affect the physical deformation of the tape, such as tape cupping, scalloping of edges, and softening of oxide coating.

There is evidence which indicates that most drop-outs are recorded on the tape during the recording process. Some of the evidence is as follows. Where the first two or three passes of a tape are not considered, reproductions of tapes which have been submitted only to one original recording show more consistent drop-out counts. However, the number and size of drop-outs vary widely with reproductions from the tape where there is a new recording each time. It has been found by comparing repeated reproductions that as many as 70 percent of the drop-outs of each size repeated themselves in four successive reproductions, approximately 20 percent of the others occurred in two or three of the four reproductions, and about 10 percent occurred in only one reproduction. When the same tape is erased and rerecorded each reproduction for several reproductions, the repeatability often drops below 50 percent, repeatability on two or three reproductions ranges from 25 to 50 percent and single drop-out occurrences are between 20 and 25 percent. With careful oscilloscope monitoring it was often found that where a 3-db or even a 6-db drop-out occurred in one recording, not even a vestige of a drop-out occurred at the same spot on the tape after a succeeding recording.

Self-dirt is a major factor causing high drop-out counts. As tapes are run repeatedly, particles of the oxide coating wear off or flake off. The freed particles may become attached to the heads, the rollers and pressure idlers, or to the tape itself.

Air-borne dirt in an environment where the air is not particularly dust-laden is not an important factor. This does not exclude the possibility that conditions may be encountered in field operations where environmental dirt may become very important.

Laboratory data has indicated that drop-out differences, where the same type or grade if tape is run on different machines, are due to difference in head-to-tape contact. There is very little difference in the number of drop-outs from a given tape whether the signal is recorded in a normal biased analog manner or in a normal saturated unbiased manner as is used in FM carrier or digital operations.

Reel effects on short drop-outs are rarely encountered under normal conditions. If the tape is stored for long periods of time on a reel in a poor wind condition, there may be a significant effect. Warped and eccentric reels would usually affect several inches of tape and the resulting effects on signal amplitude are not measured as drop-outs. However, the short-length drop-out count can be affected by the way in which the tape is wound on the reel, and therefore the better a reel can control this tape winding, the less effect it will have on drop-outs. If a tape is wound at high speed on a machine that does not give good winding control, or if the reel is bad, the drop-out count can increase considerably, apparently due to edge deformations of the tape which cause loss of contact when passing by the heads. Therefore, while reels themselves cannot be blamed too much for drop-outs, in combination with certain machines and winding speeds, they can indirectly contribute to the drop-out count.

On the basis of what has been learned about drop-outs, it would appear that tape quality and the deleterious effect of a recorder reproducer on a particular tape may be realistically ascertained in terms of drop-out characteristics.

An object of this invention is to provide a tape wear simulator for use in production testing and for use in testing tape specimens against specifications, which permits the use of drop-outs as a realistic wear criterion, which is versatile permitting simulation of wear obtained with various types of tape transport, which is easily maintained, and which performs its function rapidly and at low cost.

Other objects and advantages will appear from the following description of an example of the invention, and the novel features will be particularly pointed out in the appended claims.

Figure 2:
Figure 3:
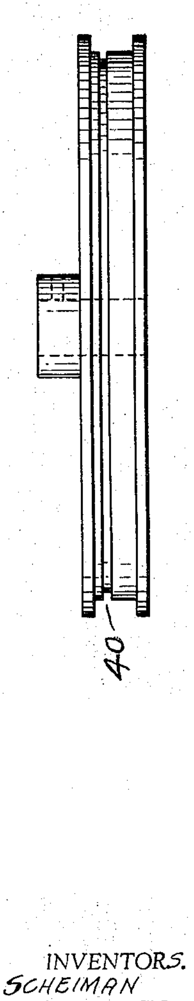
Figure 5:
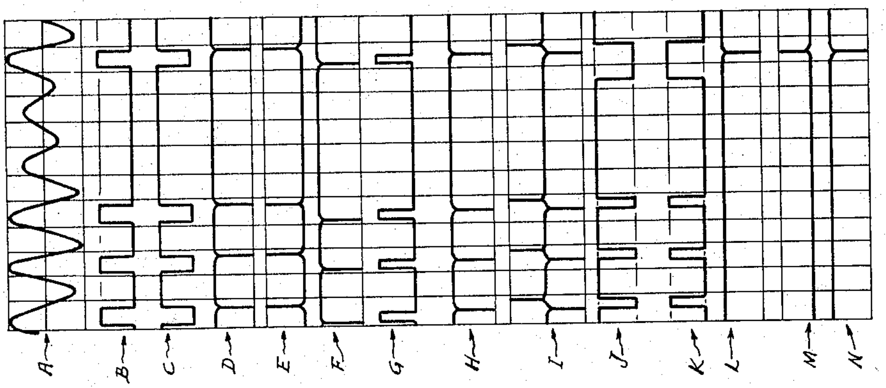
Figure 4:
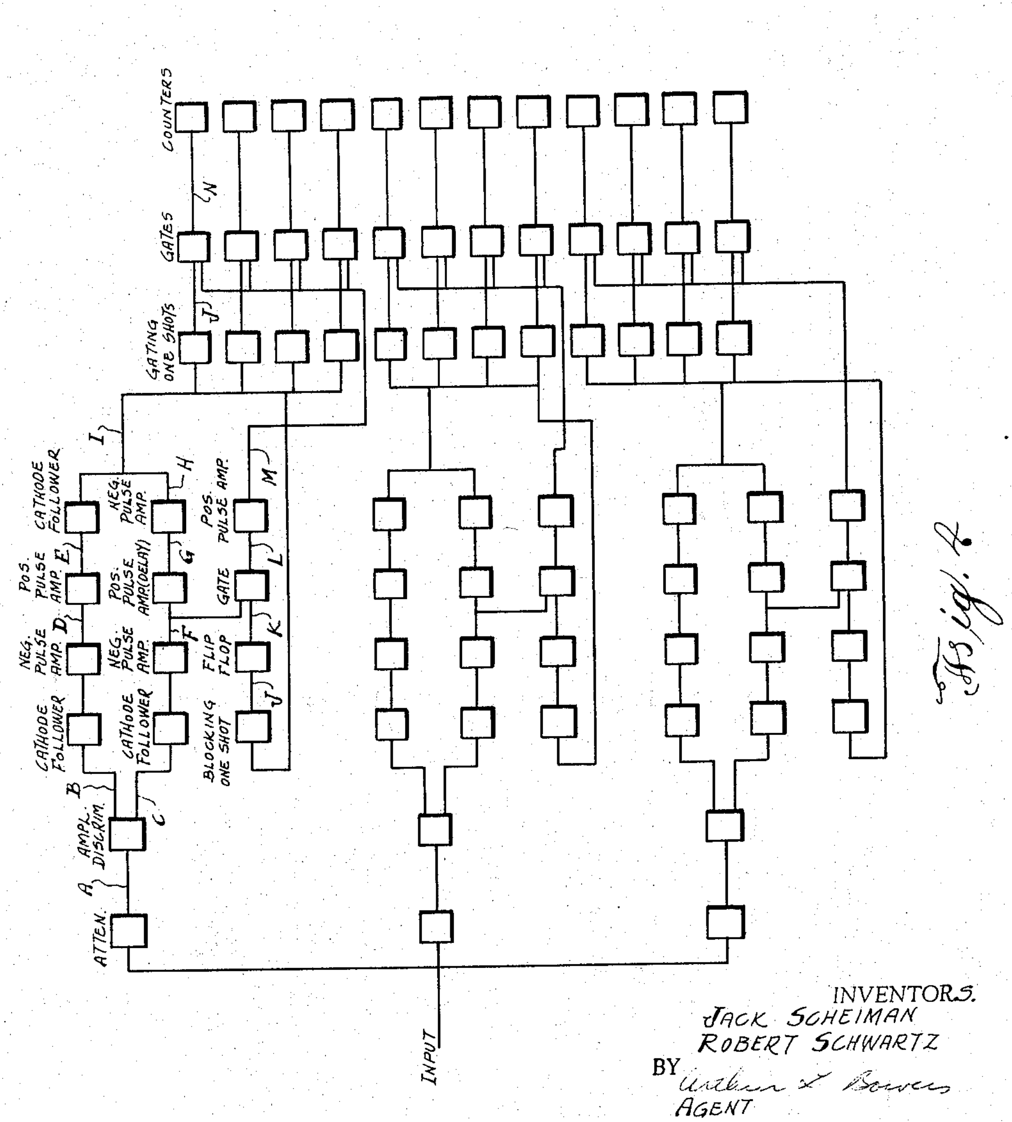

FIG. 1 is a plan view in perspective of a simulator in accordance with this invention, FIGS. 2 and 3 are side elevation views of two types of counter-rotating pulleys for the simulator of FIG. 1, and FIG. 4 is a circuit for counting drop-outs, FIG. 5 graphically illustrates the function of portions of the circuit of FIG. 4.

The embodiment of the invention shown in FIG. 1 includes a conventional tape transport 10 supporting a supply reel 12 having a friction adjustment and a motor driven takeup reel 14. In place of magnetic heads the tape transport includes two tape guide idlers 16 and 18. A plate portion 20 extends laterally from the tape transport. Five tape guide idlers 22, 24, 26, 28, and 30 are mounted on the plate portion 20. A counter-rotating pulley 32 independently driven oppositely to the takeup reel by a motor 33, and a speed control 33*a* therefor are mounted on plate portion 20. The pulley 32 is arranged laterally of the guides 28 and 30 along a perpendicular bisector of the plane defined by the axes of guides 28 and 30. The diameter of the pulley 32 is approximately equal to the distance between the axis of tape guides 28 and 30 for 180 degree tape wrap on pulley 32. Three idling pinch roller-capstan combinations 34, 36, 38 are supported on plate 20 between tape guides 22 and 24, 24 and 26, and 26 and 28, respectively.

The pulley 32 shown in FIG. 2 is formed with three annular sharp-edged steps 40 one at each end, and one intermediate the ends. In FIG. 2, the steps are undercut groves. The pulley may be formed with annular raised lands rather than grooves for use in simulating tape wear which results when magnetic heads of similar configuration are used. Though only one pulley 32 is shown in FIG. 1, the invention may include two or more such pulleys for still further accelerating wear. FIG. 3 illustrates a counter rotating pulley having one annular undercut for narrower tape. Each annular undercut is located so that one edge of the undercuts falls on the tape track. The type of tape wear caused by sliding friction over conventional tape transports is simulated by the motor driven counter rotating pulley. In addition to accelerating tape wear where there is a high relative linear speed between the tape and pulley 32, e.g., 1000 inches per second, wear is further accelerated by the annular undercut grooves 40 on the pulley surface. In passing over the counter-rotating pulley, the tape tends to wrap about the upper edges of the undercuts resulting in higher localized pressure along the lines of contact. Consequently the friction and therefore the tape wear is increased at these locations.

The pinch roller-capstan combinations, 34, 36, 38 are similar to those on some of the commercial transports. On those transports, they are one of the major causes of tape wear. In FIG. 1, each pinch roller is mounted on a pivoted arm and urged toward the respective idler capstan by a force-adjustable spring-urged plunger abutting the other end. As the tape passes between pinch roller and capstan, loose wear particles are pressed into the tape surfaces. These particles may be pressed into the surfaces at their immediate location or they may be collected at the pinch roller-capstan combinations and deposited on the tape at other locations.

A number of tape guide idlers are included in the invention because they too are a major cause of tape wear on commercial tape transports.

In using this invention variation of tape wear rate may be accomplished in three ways, namely, by varying the supply reel tape tension, by varying the counter-rotating pulley speed, and by varying the tape speed. An increase in supply reel tension while other factors remain constant results in greater friction between the tape and the counter-rotating pulley thereby increasing the wear rate. An increase in counter-rotating pulley speed while other factors remain constant results in greater tape wear by subjecting a given tape length to a greater number of pulley revolutions in a single pass through the simulator. An increase in tape speed governed by the transport pinch-roller capstan 44, while other factors remain constant results in a reduction in tape wear since the time of contact between the tape and counter-rotating pulley is decreased.

Some tape transports do not have pinch roller-capstan combinations. To simulate wear on these transports the tape is not routed through those elements of the simulator. Attempts were made to accelerate wear by means of the pinch roller-capstan combinations without using the counter-rotating pulley. Results were not satisfactory in that the wear rate was not increased significantly. When the counter-rotating plley and the pinch roller-capstan combinations are used together the wear rate is greatly accelerated. It appears that some of the particles abraded by the pulley are subsequently pressed into the tape surfaces by the pinch roller-capstan combinations, thereby producing a similar effect to that which would occur with the commercial transport pinch roller-capstan combination but at an accelerated rate.

The tape wear simulator may be used to test all types of magnetic tapes, among which are instrumentation tapes, digital tapes, television tapes and audio tapes. In order to use the tape wear simulator to predict tape wear characteristics of a particular type and grade of tape on a given type of tape transport, the following two steps are necessary. First, a sinusoidal, constant amplitude signal is recorded on reels of a variety of tape types using the tape transport. Each tape is run through that tape transport repeatedly under ordinary operating conditions. During each run the signal is read out by the magnetic head and drop-outs counted by use of a circuit as described in the NRL report and reproduced in FIGS. 4 and 5. The equipment shown in FIG. 4 can be set to trigger on three different amplitude thresholds, each threshold trigger on three different amplitude thresholds, each threshold trigger in turn controlling four gates that open for different controlled lengths of time. Twelve numbers are obtained from the counters for each pass of the tape through a machine. There are four numbers on each threshold, and each number represents the number of times that the signal has dropped below that threshold for a specified length of time. In addition to the counts appearing on the twelve counters, they can be switched into a 20 channel event recorder which makes a mark on chart paper every time a drop-out of a certain size occurs. For comparison of several runs made on the same tape, three channels may be used during a run. The chart paper is then rewound and the adjacent set of three channels are used for the next run. In this manner, the repeatability of drop-outs can be observed. The degradation of performance characteristic is ascertained, from a selected number of runs. Sister reels of one of the tape types run on the tape transport and having the same signal recorded thereon are run through the tape wear simulator, each under a different combination of supply reel tension, counter-rotating pulley speed and tape speed to ascertain the combination of parameters that simulate the same degradation of performance characteristic in the shortest time. After an accelerated wear run on the simulator, the tape is run through recorder-reproducer which recorded the signal and the reproduced signal is coupled to a counter circuit as shown in FIG. 4.

After the simulator settings are determined in this manner, the same or other types and grades of tapes having the same recorded signal are subjected to the same simulator test conditions. Relative rankings of the tapes tested is based on a comparison of their degradation of performance characteristics. Specifications may be established based upon the results to eliminate tapes considered unsatisfactory for a given application.

When using the tape wear simulator for checking tape specimens against a tape specification it is likely that the following three factors and their limits need to be considered. These factors are the initial dropout count, the slope of the dropout characteristic; and the scatter of the points comprising the dropout characteristic. The initial dropout count is a measure of defects in the tape in the virgin state. The specification probably recites a maximum acceptable initial dropout count. The initial dropout count is the reference from which degradation is measured. The slope of the dropout characteristic is an indication of the tape wear rate. It is probable that a maximum acceptable slope for the dropout characteristic is recited in the specification. Scatter is an indication of variability resulting from such causes as loose oxide deposits. A related requirement in tape specifications is the number of points outside the curve represented by the maximum slope dropout characteristic; for example, a tape specification may permit a single dropout count to fall outside the maximum characteristic providing the succeeding two counts are satisfactory.

With the rapidly increasing use of tape for the recording of scientific data coupled with the higher costs of special instrumentation tape, it is essential to select with care the tape to be used for any given application, and to know the variation of wear rates on different types of tape transports. This simulator is an invaluable aid in accomplishing this result.

It will be understood that various changes in the details, materials, and arrangement of parts (and steps), which have been herein described and illustrated in order to explain the nature of the invention, may be made by those skilled in the art within the principle and scope of the invention as expressed in the appended claims.

We claim:

1. A magnetic tape wear simulator comprising
   tape transport means including a supply reel assembly and a driven takeup reel assembly,
   a driven counter-rotating pulley having an annular step presenting a sharp circular edge intermediate the ends thereof located to coincide with a tape track,
   an idler pinch roller-capstan combination,
   a plurality of idler guides for engaging from the supply reel tape on the non-coated face and for guiding the tape between the supply reel and the takeup reel for a predetermined angle of wrap-around engagement of the coated tape surface with said counter rotating pulley and for passage between said idler pinch-roller-capstan combination.

2. A magnetic tape wear simulator as defined in claim 1, wherein the annular step is an undercut.

3. A magnetic tape wear simulator as defined in claim 1, wherein said driven counter-rotating pulley is adjustable in speed of rotation.

References Cited

UNITED STATES PATENTS

| | | | |
|---|---|---|---|
| 1,857,669 | 5/1932 | Sundback | 73—7 XR |
| 3,071,723 | 1/1963 | Gabor | 179—100.2 XR |
| 3,238,293 | 3/1966 | Hartman | 179—100.2 XR |
| 3,270,930 | 9/1966 | Emerson | 179—100.2 XR |

LOUIS R. PRINCE, *Primary Examiner.*

J. NOLTON, *Assistant Examiner.*